United States Patent Office 2,841,503
Patented July 1, 1958

2,841,503

FILM-FORMING HYDROSOLS OF BARIUM TITANATE, THEIR PREPARATION AND A SUBSTRATE COATED THEREWITH

Boynton Graham and Gordon D. Patterson, Wilmington, Del., assignors to E. I. du Pont de Nemours and Company, Wilmington, Del., a corporation of Delaware No Drawing. Application December 19, 1955
Serial No. 553,730

11 Claims. (Cl. 106—286)

This invention relates to new compositions of matter and methods for their preparation. More particularly, this invention relates to new hydrosols, to their preparation, and to thin films of barium titanate on substrates and their preparation.

Alkaline earth titanates of the general formula $MTiO_3$ wherein M is an alkaline earth metal have been known for a long time. These titanates are available, for example, by the sintering of an alkaline earth oxide with titanium dioxide. Barium titanate has also been prepared by the reaction of barium salts with hydrated titania under aqueous conditions. However, no hydrosol of barium titanate has heretofore been described.

These alkaline earth titanates thus far prepared are insoluble in water, resistant to both oxidizing and reducing agents and have a high specific gravity and refractive index. In view of these properties, barium titanate has been used in pigments to take advantage of its high hiding power. In addition to properties relating to utility in pigment preparation, alkaline earth titanates, and particularly barium titanate, have been formed into ceramic products and found to have outstanding electrical properties, e. g., a high dielectric constant.

However, barium titanate has not achieved utility as thin coatings in electrical insulation applications since no practical method is known for producing continuous films of this dielectric in the thickness range of not more than a few microns. It has been reported that a thin film of barium titanate can be obtained provided a technique involving vacuum evaporatiton of solid anhydrous titanate is used. Such a procedure is expensive and requires considerable equipment. It is not generally applicable to coatings involving a large area. The provision of a practical process for the preparation of thin films of barium titanate at low temperatures and a composition of barium titanate from which they could be made would increase the usefulness of barium titanate for electrical applications.

It is an object of this invention to provide new compositions of matter and methods for their preparation. A further object is to provide new hydrosols and methods for their preparation. A still further object is to provide new film-forming hydrosols. Another object is to provide a composition containing barium titanate from which very thin continuous films of barium titanate can be applied to substrates. Still another object is to provide a new form of barium titanate and a method for obtaining thin continuous films of barium titanate on substrates. An additional object is to provide substrates coated with a continuous film of barium titanate deposited from a barium titanate hydrosol. Other objects will appear hereinafter.

These and other objects of this invention are accomplished by providing a hydrosol of barium titanate. These barium titanate hydrosols comprise water, barium titanate in the form of a sol dispersed therein in amount from 0.01 to 5% by weight, and an acid having a pKa of less than 5 as the peptizing agent in amount of not more than 150 mole percent based on the barium titanate. Thus these barium titanate hydrosols contain 0.01 to 5% barium titanate by weight of the entire composition and not more than 150 mole percent, based on the barium titanate, of an acid having a pKa less than 5.

Thin films of barium titanate are easily prepared by coating or spraying the hydrosol of barium titanate on a substrate and drying. These thin films of barium titanate have useful electrical properties.

The hydrosol is produced by treating barium titanate, previously obtained by the reaction of barium hydroxide with titanium dioxide sol, in water with an acid in the above stated amounts. The process for preparing a film-forming hydrosol of barium titanate comprises precipitating barium titanate with barium hydroxide from an aqueous solution of colloidal titanium dioxide, adding an amount of water to the precipitated barium titanate to form a concentration of from 0.01 to 5% barium titanate with the peptization of said barium titanate to a sol by an acid having a pKa of less than 5 and in amount of not more than 150 mole percent of the barium titanate.

The following examples further illustrate the preparation and use of barium titanate hydrosols of this invention.

EXAMPLE I

*Barium titanate hydrosol peptized with hydrochloric acid*

One hundred parts of an uncalcined anatase wet filter cake, prepared as subsequently described according to the general procedure of U. S. Reissue Patent 18,854, and containing 39 parts of anatase was slurried in 200 parts of water; the slurry was stirred and brought to a pH of 7.0 by the addition of ammonia and the pigment was then filtered and, without drying, was washed thoroughly with water until the filtrate was sulfate-free (barium chloride test). The wet filter cake was dispersed in 500 parts of water, and 5 parts of concentrated hydrochloric acid was added to peptize the titania. The resultant acid-peptized titania sol was a stable bluish milky fluid containing 3.88% titania.

To 113.3 parts of the above-described titania sol was added 15.775 parts of barium hydroxide octahydrate, and the mixture was refluxed for one hour. It was then filtered and, without drying out, was washed with water until the filtrate was free of barium ions (sulfate test). The wet filter cake was stirred into 100 parts of water. The resultant heavily flocculated dispersion of barium titanate settled rapidly upon standing. It contained 5.14% barium titanate.

To 50 parts of the above-described barium titanate dispersion was added 1.5 parts (27 mole percent based on the barium titanate) of 2 N hydrochloric acid. Upon shaking, the dispersion was peptized to a milky sol of barium titanate which was stable for 2–3 hours at room temperature. This contained slightly less than 5% barium titanate.

When flowed on a glass plate and air dried, the barium titanate sol gave a hazy, bluish, continuous film.

The uncalcined anatase wet filter cake was obtained from a titanium ore by the following general procedure (see Reissue Patent No. 18,854): The titanium bearing ore was dissolved in sulfuric acid to give a solution in which ferric ion was avoided by the presence of metallic iron. Hydrolysis was accomplished by heating the solution, with dilution by water, to about 100° C. to precipitate the titanium dioxide, which was filtered and washed.

EXAMPLE II

*Barium titanate hydrosol peptized with hydrochloric acid*

Barium titanate was prepared as described in Example I, except that the barium hydroxide octahydrate was pre-dissolved in 40 parts of water and the solution was filtered directly into the titania sol, which was maintained under an atmosphere of nitrogen during the filtration and subsequent period of reflux. The thoroughly washed barium titanate filter cake was diluted to a solids content of 0.24% and peptized by the addition of 30 mole percent of hydrochloric acid, based on the barium titanate. The resultant milky sol of barium titanate was stable for about one hour at room temperature.

A film of the barium titanate sol flowed on glass and air dried was smooth, hazy and bluish, and gave a sharp X-ray diffraction pattern identical with that of the cubic modification of barium titanate.

A film of the barium titanate sol was flowed on chrome plate which had been rubbed with a wetting agent ("Triton" X–100, octylphenyl polyglycol ether) to promote spreading. After baking for 24 hours at 90° C., the film weighed $1.57 \times 10^{-4}$ g./cm.$^2$, which is equivalent to a thickness of 0.26 micron, assuming that the film had a density of 6.03 g./ml., the value cited for bulk ceramic barium titanate. When tested electrically under a pool of mercury, the film had a volume resistivity of $>10^9$ ohm-cm., and this was maintained after heating to 440° C. in air during 3 hours.

Another film of the barium titanate sol was flowed on tin foil. After baking 8 hours at 200° C., the coated foil was bent around a 2-mm. mandrel. The film did not crack and did not exhibit electrical conductivity when tested under a pool of mercury. When heated in air to 440° C. during 3 hours, the tin substrate melted. The residual film was self-supporting, and still exhibited the X-ray diffraction pattern of barium titanate.

EXAMPLE III

*Barium titanate hydrosol peptized with trichloroacetic acid*

Barium titanate prepared as in Example II was diluted to 3.5% concentration and peptized by adding 50 mole percent of trichloroacetic acid. The resultant milky sol of barium titanate was stable for 4–8 days at room temperature. It was diluted to 1% concentration and flowed on aluminum foil which had been rubbed with a wetting agent ("Triton" X–100, octylphenyl polyglycol ether).

After heating in air to 550° C. during 2.5 hours, the 0.94 micron film of barium titanate was hard, glossy, and well adhered, even when wet. When tested under conductive silver paint electrodes, it had a dielectric constant of 13.8–16.8, a power factor of 0.293–0.303, and a volume resistivity of $10^{10-11}$ ohm-cm. The X-ray diffraction pattern of the film was that of cubic barium titanate.

A similar 0.43 micron film, obtained by flowing a 0.5% concentration sol of barium titanate, had a volume resistivity of $10^{13}$ ohm-cm. and did not crack, even when sharply creased.

The 1% sol of barium titanate was spread on platinum foil, dried for one hour at 90° C., washed well with water, and a second coating of the sol was applied and similarly baked and rinsed. After heating to 880° C. during 75 minutes, the resultant 1.36 micron film, when tested under a pool of mercury, had a dielectric constant of 3.7, a power factor of 0.472, and a volume resistivity of $10^{11-12}$ ohm-cm. Examination of the peptized sol in the electron microscope indicated it to comprise hexagonal particles of about 0.16 micron in diameter, clustered into aggregates averaging about 10 microns in diameter. In contrast, the dispersion prior to addition of the peptizing agent comprised large flocks up to several millimeters in diameter.

The 1% barium titanate sol was spread on silver foil which had been rubbed with a wetting agent ("Triton" X–100, octylphenyl polyglycol ether). After baking 3.5 hours at 200° C., the 0.65 micron film had a volume resistivity under mercury of $>10^9$ ohm-cm.

A 1 micron film of barium titanate similarly applied to stainless steel and heated to 700° C. likewise had a volume resistivity under mercury of $>10^9$ ohm-cm. Similar results were obtained using substrates of palladium.

An aluminum foil was heated to 180° C. and the 1% concentration sol of barium titanate was sprayed onto the surface of the foil in an atmosphere of steam. The coated foil was then heated to 550° C. during 2 hours. The resultant 0.97 micron film of barium titanate was bright and glossy, with a dielectric constant of 17–31, a power factor of 0.427–0.55, and a volume resistivity of $10^{8-10}$ ohm-cm.

An aqueous barium titanate dispersion prepared as described in Example II was diluted to 1% concentration and peptized by adding 25 mole percent of trichloroacetic acid. The sol of barium titanate was stable for 4 hours at room temperature. When applied in two coats to aluminum foil and heated to 630° C. during one hour, a 1.62 micron film was obtained which had a dielectric constant of 12.3–19.2, a power factor of 0.043–0.049, and a volume resistivity of $10^{12}$ ohm-cm.

EXAMPLE IV

*Barium titanate hydrosols peptized with various acids*

Barium titanate prepared as in Example II was diluted to 1% concentration and peptized by adding 50 mole percent of nitric acid. The resultant milky sol of barium titanate was stable for ten days at room temperature.

A 0.9 micron film of this barium titanate sol flowed on aluminum foil and baked at 450° C. had a volume resistivity of $10^{10}$ ohm-cm. The film had good adhesion and was not removed or changed in volume resistivity by extraction with water.

Similar peptization to film-forming sols was obtained by replacing the nitric acid with equivalent amounts of formic acid, trichloroacetic acid, 4-carbamoyl-2,3,5-triketopyyrolidine, pentacyanopropylene, tetracyanoethane, hexacyanoisobutylene, or p-toluenesulfonic acid.

EXAMPLE V

*Barium titanate/calcium fluoride hydrosol*

A barium titanate sol (1% concentration) prepared as described in Example III was blended with a calcium fluoride sol (5% concentration) prepared as described by Bachman and Pinnon, Kolloid Z., 62, 131 (1933), to give a $BaTiO_3:CaF_2$ ratio of 95:5. The blend (1.04% concentration), cast on platinum foil and heated to 900° C. during one hour, gave a 3.3 micron film having good wet adhesion and a volume resistivity of $>10^9$ ohm-cm.

EXAMPLE VI

*Barium titanate hydrosol peptizing technique*

Two hundred and twenty-four parts of a 3.56% concentration, hydrochloric acid peptized titania sol was heated to boiling under nitrogen and stirred while a filtered solution of 34.65 parts of barium hydroxide octahydrate in 100 parts of water was added. After refluxing for one hour, the slurry was washed with water under nitrogen until the filtrate was free of barium ions. The wet filter cake was diluted to 8.52% concentration, and 50 parts of 1 N trichloroacetic acid (50 mole percent based on the barium titanate) was added with stirring. At this point, the dispersion was still heavily flocculated. However, upon dilution to 1–2% concentration of barium titanate, it spontaneously peptized to a milky sol.

This barium titanate sol was spread on aluminum foil which had been rubbed with a wetting agent ("Triton" X–100, octylphenyl polyglycol ether), air dried and heated to 600° C. during two hours to give a 1.08 micron film of barium titanate with a dielectric constant of 6.7–12.4, a power factor of 0.45–0.51, and a volume resistivity of $10^{9-10}$ ohm-cm.

EXAMPLE VII

*Barium titanate hydrosol from rutile*

To 68 parts of 29% aqueous ammonia in 600 parts of water was added dropwise with stirring 365 parts of a solution of 69 parts of titanium tetrachloride in 500 parts of water. The resultant amorphous precipitate was filtered and washed with water until it spontaneously peptized. The peptized rutile sol contained 6.82% $TiO_2$. To 129 parts of the sol was added 55 parts of 2 N hydrochloric acid. The mixture was heated to boiling and stirred under nitrogen, and a freshly filtered solution of 31.55 parts of barium hydroxide octahydrate in 150 parts of water was added. After stirring at reflux for one hour, the precipitate was filtered and washed until the filtrate was free of barium ions.

The wet filter cake was diluted to 0.35% concentration with water and 132 mole percent of trichloroacetic acid was added. The dispersion peptized to a film-forming milky sol of barium titanate which was stable for 2–3 days at room temperature.

EXAMPLE VIII

*Barium titanate hydrosol from formic acid peptized titania*

Uncalcined anatase washed free of sulfate as described in Example I was slurried in water at 11.64% concentration and peptized by adding 25 mole percent of 1 N formic acid. To 206 parts of the titania sol was added a freshly filtered solution of 63 parts of barium hydroxide octahydrate in 200 parts of water. After refluxing with stirring under nitrogen for one hour, the barium titanate was filtered, thoroughly washed, diluted to 1% concentration, and peptized by adding 50 mole percent of 1 N formic acid. A 0.88 micron film of this barium titanate sol spread on aluminum foil had a volume resistivity of $>10^9$ ohm-cm.

EXAMPLE IX

*Barium titanate hydrosol peptized with formic acid*

An aqueous barium titanate dispersion prepared as described in Example II was diluted to 11.82% concentration, and 50 mole percent of 1 N formic acid was added based on the barium titanate. The dispersion deflocculated when diluted with water to 1% concentration. It was spread on aluminum foil which had been rubbed with a wetting agent ("Triton" X–100, octylphenyl polyglycol ether), air dried and heated to 560° C. during 2 hours.

The 0.93 micron film of barium titanate had a dielectric constant of 4.6–5.8, a power factor of 0.053–0.067, and a volume resistivity of $10^{12}$ ohm-cm. The X-ray diffraction pattern of the film was that of the cubic modification of barium titanate.

A similar barium titanate film of 2.15 microns in thickness was prepared in two coats. After heating to 600° C. during one hour, it had a dielectric constant of 6.1–9.3, a power factor of 0.035–0.048, a volume resistivity of $10^{12}$ ohm-cm. and a dielectric strength of 24–66 volts/mil.

EXAMPLE X

*Barium titanate/strontium titanate hydrosol blend*

Strontium titanate was prepared by a process similar to that described in Example II, except that an equivalent amount of an aqueous solution of strontium hydroxide was substituted for the barium hydroxide solution of Example II. The thoroughly washed strontium titanate was diluted to 1% concentration and peptized by adding 50 mole percent of formic acid. The resultant sol of strontium titanate was not film forming.

To one part of the strontium titanate sol was added 100 parts of a 1% barium titanate sol prepared as described in Example IX. A 1.95 micron film was spread from the mixed sols in two coats on aluminum foil. After heating to 560° C. during two hours, the film had a dielectric constant of 5.5–8.3, a power factor of 0.04–0.053, a volume resistivity of $10^{12}$ ohm-cm. and a dielectric strength of 56–108 volts/mil.

EXAMPLE XI

*Barium titanate/alumina hydrosol blend*

A sol of hydrous alumina was prepared by the method of U. S. Patent 2,590,833. The sol was peptized with 4 mole percent of propionic acid, and contained 3.08% of alumina. A blend of 6.5 parts of this sol with 1000 parts of a 1% barium titanate sol prepared as described in Example IX was spread in two coats on aluminum foil which had been rubbed with a wetting agent ("Triton" X–100, octylphenyl polyglycol ether) and heated to 560° C. during two hours.

The 1.71 micron film had good wet adhesion, a dielectric constant of 6.3–8.6, a power factor of 0.042–0.048, a volume resistivity of $10^{12}$ ohm-cm. and a dielectric strength of 50-144 volts/mil.

In the preparation of a barium titanate hydrosol, the barium titanate employed is obtained by aqueous reaction of a barium salt, preferably the hydroxide, with colloidal titanium dioxide. The barium titanate thus formed precipitates from the aqueous medium and can be purified by washing and filtration. In the preparation of the barium titanate hydrosol, it is necessary that the barium titanate be obtained by such an aqueous reaction. Barium titanate prepared by conventional dry firing or calcination procedures will not give the sols of this invention.

Colloidal titanium dioxide is readily available as described in U. S. Reissue Patent No. 18,854. To simplify purification procedures and increase the yield, it is preferred that barium hydroxide be employed in an excess of 5 to 10% in the preparation of the titanate. The unreacted excess barium salt is removed by water washing.

The barium titanate is converted to a hydrosol by the peptizing action of a suitable acid on a mixture of the barium titanate in water. Preferably, the barium titanate is never allowed to dry out, from the time it is prepared until it is peptized and the film is cast. The concentration of the barium titanate in water is generally between 0.2% and 5.0% although the concentration can be considerably lower, e. g., as low as 0.01%. The actual concentration chosen is dependent upon the ultimate use of the hydrosol. The hydrosol is formed by the peptizing action of a water-soluble acid, preferably a monobasic acid. The peptizing acid may be added to the aqueous barium titanate at any desired concentration of the barium titanate, e. g., up to 40–50%, but peptization to a film-forming sol is not obtained until the mixture is diluted to about 5% or less concentration of the barium titanate.

The acid is one that has a pKa of less than 5 and preferably less than 4. The acid is employed in an amount of not more than 150 mole percent and generally less than 100 mole percent and at least 10 mole percent based on the amount of barium titanate. Preferably the acid is present in a total amount of 20–60 mole percent.

The acid is preferably an organic acid, since such an acid can be largely removed from finished films by firing treatments, thereby improving electrical properties. In addition to the acids employed in the examples, other acids can be used to effect the peptizing. Such acids include the halogenated lower alkanoic acids, the halogen acids, and cyano acids such as 1,1,3,3-tetracyanopropene and 2-methyl-1,1,3,3-tetracyanopropene.

The barium titanate hydrosol thus obtained is stable for at least one hour at room temperature. The particle size of the colloidal particles is generally within the range of 0.5 to 0.001 micron, most often 0.1–0.2 micron.

The barium titanate hydrosol is useful for the preparation of thin coatings of barium titanate on various surfaces and particularly on metals, simply by spreading, spraying or dipping, followed by evaporation of water. Of the metal substrates, aluminum is preferred since superior electrical properties of the films are achieved on this metal. The thickness of a single coating can be varied within chosen limits by varying either the amount of hydrosol or the concentration of colloidal barium titanate in the hydrosol. Multiple coatings may be utilized for the preparation of thicker films. The property of film formation is unusual. Most inorganic sols, as well as the non-peptized dispersion, on drying give a layer of powdery particles.

The coatings, particularly of up to 2 microns, as shown in the examples, after baking at temperatures of above 100° C. and preferably above 200° C., are effective insulators and useful in electrical applications. The use of the barium titanate hydrosol of this invention permits thin continuous films to be formed at relatively low temperatures. This is of considerable value in the electronics industry and advantage can now be taken of the favorable electrical properties of barium titanate for thin film insulations.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A film-forming hydrosol of barium titanate comprising water, barium titanate as the major film-forming ingredient in the form of a sol dispersed therein in amount from 0.01 to 5% by weight, and an acid having a pKa of less than 5 as the peptizing agent in amount of at least 10 and not more than 150 mole percent based on said barium titanate.

2. A film-forming hydrosol of barium titanate comprising water, barium titanate as the major film-forming ingredient in the form of a sol dispersed therein in amount from 0.2 to 5% by weight, and an acid having a pKa of less than 4 as the peptizing agent in amount of at least 10 and not more than 150 mole percent based on said barium titanate.

3. A film-forming hydrosol of barium titanate comprising water, barium titanate as the major film-forming ingredient in the form of a sol dispersed therein in amount from 0.2 to 5% by weight, and a monobasic acid having a pKa of less than 4 as the peptizing agent in amount of 20 to 60 mole percent based on said barium titanate.

4. Process for preparing a film-forming hydrosol of barium titanate which comprises precipitating barium titanate with barium hydroxide from an aqueous solution of colloidal titanium dioxide, adding to the precipitated barium titanate an acid having a pKa less than 5 in amount of at least 10 and not more than 150 mole percent based on said barium titanate and an amount of water to form a concentration of 0.01 to 5% barium titanate, thereby peptizing said barium titanate to a sol.

5. Process for preparing a film-forming hydrosol of barium titanate which comprises precipitating barium titanate with barium hydroxide from an aqueous solution of colloidal titanium dioxide, adding to the precipitated barium titanate an acid having a pKa of less than 4 in amount of at least 10 and not more than 150 mole percent based on said barium titanate and an amount of water to form a concentration of 0.2 to 5% barium titanate, thereby peptizing said barium titanate to a sol.

6. Process for preparing a film-forming hydrosol of barium titanate which comprises precipitating barium titanate with barium hydroxide from an aqueous titanium dioxide sol, adding to the precipitated barium titanate a monobasic acid having a pKa of less than 4 in amount of 20 to 60 mole percent of said barium titanate and an amount of water to form a concentration of 0.2 to 5% barium titanate, thereby peptizing said barium titanate to a sol.

7. A film-forming hydrosol of barium titanate comprising water, an aqueous precipitated barium titanate as the major film-forming ingredient in the form of a sol dispersed therein in amount from 0.2 to 5% by weight, and an acid having a pKa of less than 5 as the peptizing agent in amount of at least 10 and not more than 100 mole percent based on said barium titanate.

8. A film-forming hydrosol of barium titanate as set forth in claim 7 wherein said aqueous precipitated barium titanate in the form of a sol is the sole film-forming ingredient.

9. A method for preparing continuous thin films of barium titanate which comprises coating a substrate with a film-forming hydrosol of barium titanate as set forth in claim 1, and drying said hydrosol of barium titanate to a continuous thin film adherent to said substrate and having a thickness of not more than about 2 microns.

10. An aluminum substrate containing an adherent coating consisting of at least 95% barium titanate as a continuous thin film of not more than about 2 microns in thickness and which is deposited from a film-forming hydrosol of barium titanate as set forth in claim 1.

11. An aluminum substrate containing an adherent coating consisting of barium titanate as a continuous thin film of not more than about 2 microns in thickness and which is deposited from a film-forming hydrosol of barium titanate as set forth in claim 1.

References Cited in the file of this patent

UNITED STATES PATENTS

| Number | Name | Date |
|---|---|---|
| 2,347,733 | Christensen | May 2, 1944 |
| 2,369,327 | Wainer | Feb. 13, 1945 |
| 2,384,541 | Fruth | Sept 11, 1945 |
| 2,426,609 | Hodgdon | Sept. 2, 1947 |
| 2,597,384 | Sanders | May 20, 1952 |